United States Patent [19]
Kakumoto et al.

[11] 3,973,239
[45] Aug. 3, 1976

[54] PATTERN PRELIMINARY PROCESSING SYSTEM

[75] Inventors: Shigeru Kakumoto, Kokubunji; Toshihiro Hananoi, Kanagawa; Hirohide Endou, Kodaira, all of Japan

[73] Assignee: Hitachi, Ltd., Japan

[22] Filed: Oct. 15, 1974

[21] Appl. No.: 515,075

[30] Foreign Application Priority Data
Oct. 17, 1973   Japan.............................. 48-115813
Mar. 1, 1974    Japan............................... 49-23328
Mar. 29, 1974   Japan.............................. 49-34439

[52] U.S. Cl............. 340/146.3 AG; 340/146.3 MA
[51] Int. Cl.² ........................................ G06K 9/12
[58] Field of Search........ 340/146.3 MA, 146.3 AG, 340/146.3 R

[56] References Cited
UNITED STATES PATENTS
3,104,372   9/1963   Rabinow et al........... 340/146.3 AG
3,234,513   2/1966   Brust......................... 340/146.3 AG
3,675,201   7/1972   McKissick et al......... 340/146.3 AG
3,688,266   8/1972   Watanabe et al. ........ 340/146.3 MA
3,701,095   10/1972  Yamaguchi et al. ...... 340/146.3 MA
3,715,724   2/1973   DeMonte et al.......... 340/146.3 AG Primary Examiner—Leo H. Boudreau
Attorney, Agent, or Firm—Craig & Antonelli

[57]        ABSTRACT

A pattern preliminary processing system wherein high and low frequency noise other than the pattern signal from a pick-up tube are eliminated by a filtering circuit thereby to "relieve" the pattern against the background and the thus obtained pattern signal is tri-valued into signals of high, medium and low levels by means of a processing circuit having two different threshold values, and then the signal of the medium level is converted into a signal of high or low level with reference to peripheral information thereby to finally bi-value the pattern signal.

8 Claims, 31 Drawing Figures

FIG. 8a
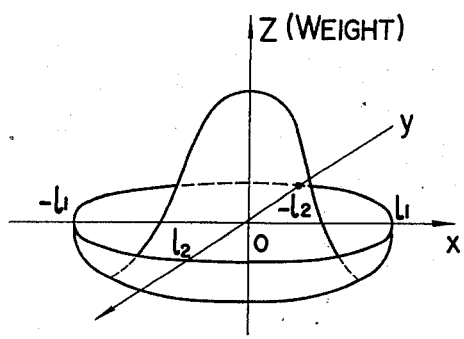
FIG. 8b
| 0 | -1 | -1 | -1 | -1 | 0 |
|---|---|---|---|---|---|
| -1 | 0 | 0 | 0 | 0 | -1 |
| -1 | 0 | 4 | 4 | 0 | -1 |
| -1 | 0 | 4 | 4 | 0 | -1 |
| -1 | 0 | 0 | 0 | 0 | -1 |
| 0 | -1 | -1 | -1 | -1 | 0 |
FIG. 9a
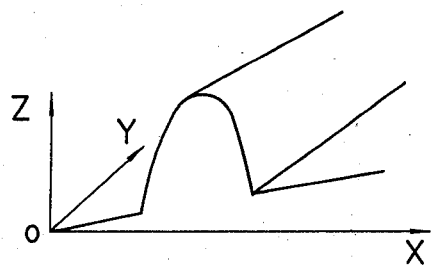
FIG. 9b
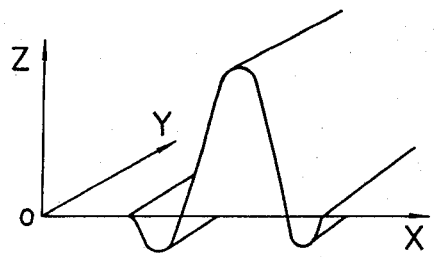

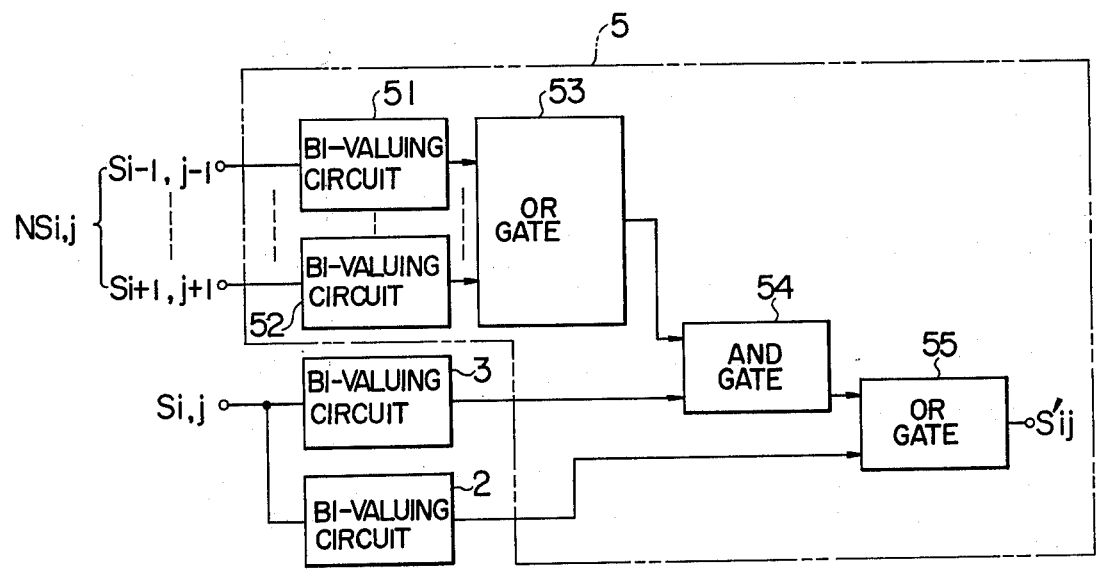

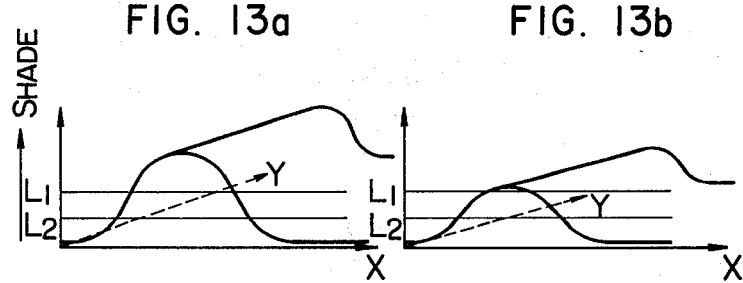
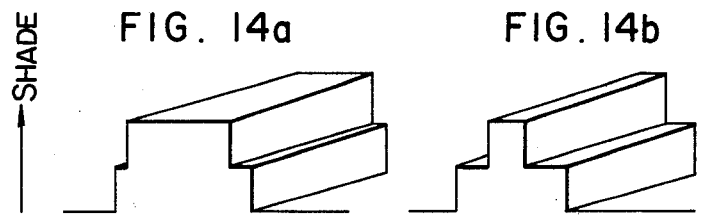
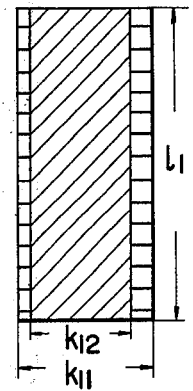 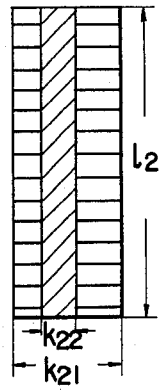

PATTERN PRELIMINARY PROCESSING SYSTEM

BACKGROUND OF THE INVENTION

1. Field of the Invention

This invention relates generally to a pattern preliminary processing system used mainly for recognition of patterns such as a printed character and a hand-written character, and more particularly relates to pattern preliminary processing system in which a signal representative of an arbitrary pattern is tri-valued and the resulting tri-valued signal is converted into a bi-valued signal with reference to one- or two-dimensional information peripheral thereto.

2. Description of the Prior Art

The optical character reader for recognizing printed characters and hand-written characters generally comprises a pre-processing unit for bi-valuing pattern signals picked up by such a pattern input device as the pick-up tube or flying spot scanner and thinning and normalizing the resulting bi-valued pattern, and a recognizing unit for extracting features from the normalized bi-valued pattern and for comparing the features thereof with those of a standard pattern thereby to recognize an unknown input pattern by detection of an agreement therebetween.

In the conventional preliminary processing system, it is common practice to obtain a bi-valued pattern from a pattern signal derived from an image pick-up device by dividing the pattern signal at a predetermined threshold level into a character part above the threshold represented by "1" and a background part under the threshold represented by "0". In the case where the original paper carries a stain or smear or the characters are partially broken, however, the stained or smeared portion may present itself as 1 and the broken portion as 0 erroneously, with the result the bi-valued pattern may be broken or distorted or noise is generated which is liable to be confused with part of the character, thus making it impossible to produce a bi-valued pattern high in quality.

Further, in the event that the shade of a character is different at different parts thereof, a bi-valued pattern associated therewith has portions different in thickness. Also, if one portion of the background is different in brightness from the other portion, it may be difficult to accomplish a bi-valuing process by limiting the characters to 1 and the background to 0.

SUMMARY OF THE INVENTION

Accordingly, it is an object of the present invention to provide a preliminary processing system which is capable of, in a bi-valuing process, limiting 1 to characters without being affected by noise such as a stain or smear on the original paper and which is capable of producing a substantially uniform bi-valued pattern from an input pattern signal without being affected by the difference in the shade of the characters or the contrast relative to the background.

In order to achieve the above-mentioned objects, the preliminary pattern processing system according to the invention comprises a filtering process circuit for "relieving" the character against the background prior to bi-valuing an input pattern signal and a processing circuit for dividing the pattern signal into three signals of high, medium and low levels by means of two different threshold levels and converting the signal of the medium level into signal of the high or low level with reference to peripheral information thereby to finally bi-value the pattern signal.

According to another aspect of the invention, the threshold levels are changed in accordance with input pattern signals.

BRIEF DESCRIPTION OF THE DRAWINGS

FIGS. 8a, 8b, 9a, 9b, 10a, 10b and 10c are diagrams for explaining the weight distribution of the filtering process section.

FIGS. 11 and 12 are block diagrams showing examples of the bi-valuing process section of the system according to the invention.

FIGS. 13a, 13b, 14a, 14b, 15a and 15b are diagrams for explaining the bi-valuing processes.

DESCRIPTION OF THE PREFERRED EMBODIMENTS

Figure 1:
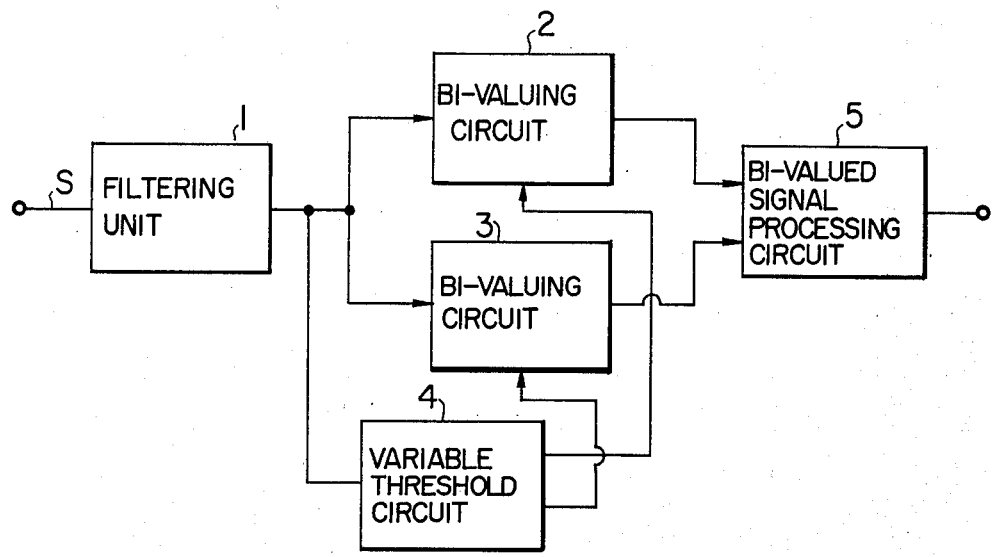
FIG. 1 is a block diagram showing an embodiment of the invention.

Embodiments of the invention will be explained below with reference to FIG. 1.

Figure 2:
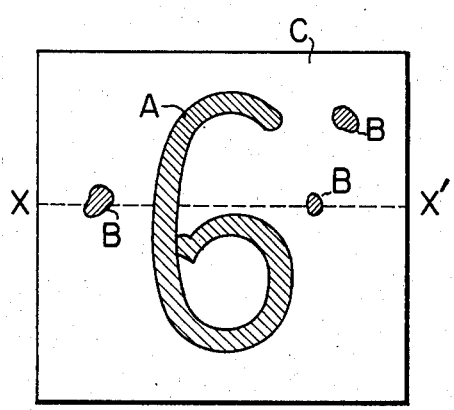
FIG. 2 is a diagram showing an example of the pattern to be recognized.
Figure 3A:
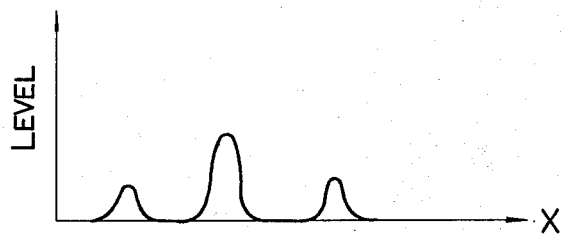
FIGS. 3a, 3b, 3c, 4a and 4b show waveforms obtained from a pick-up tube.
Figure 3B:
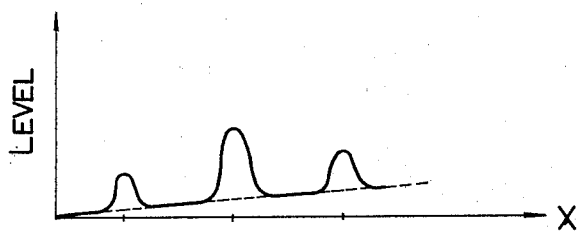
Figure 3C:
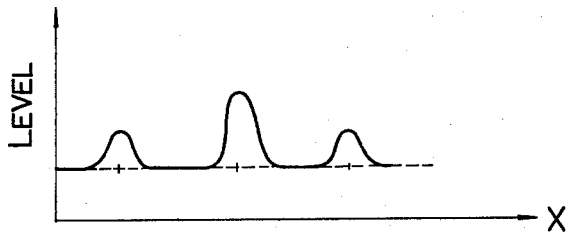

A pattern signal S from a pattern input device (not shown) including a pickup-tube or flying spot scanner is applied to a filtering unit 1. Assume that as shown in FIG. 2 there is a character A in the form of "6" together with smears or stains B on the white original C or background. The scanning of the original along the line X — X' causes the signal S with the waveform as shown in FIG. 3a to be produced. In this case, if the original C is darker toward the point X', the signal S takes the form as shown in FIG. 3b. When the whole surface of the original is dark, on the other hand, the signal S has the waveform as shown in FIG. 3c. As a result, in the conventional system relying on a fixed level of threshold for bi-valuing operation, it is impossible to obtain a bi-valued pattern in which only the character A is represented by 1 and the other portions B and C by 0.

One of the functions of the filtering unit 1 is to convert pattern signals with waveforms as shown in FIGS. 3b and 3c into signals not affected by shade variations of the original as shown in FIG. 3a. Another function of the filtering unit 1 is to emphasize the change in shade along the boundary between the character A and the background and relieve the character A as a whole against the background or the face of the original thereby to facilitate the bi-valuing operation to be performed in the following stage.

Figure 4A:
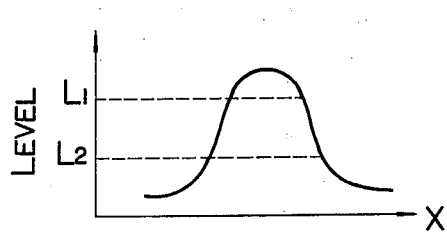
Figure 4B:
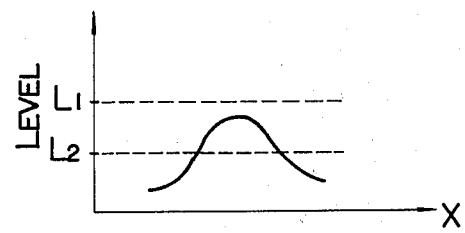

The output of the filtering unit 1 is applied to the bi-valuing circuits 2 and 3 on the one hand and to the variable threshold circuit 4 on the other. The pattern input signal is divided into two signals of different values at the threshold $L_1$ by the bi-valuing circuit 2 and into two signals of different values at the threshold $L_2$ by the bi-valuing circuit 3, $L_1$ being larger than $L_2$. On the other hand, the variable threshold circuit 4 is provided for the purpose of determining the threshold values $L_1$ and $L_2$ in accordance with the pattern input signal. The variable threshold circuit 4 is required for the following reason: It often happens that different characters or characters in different lines printed with the same black ink are different in shade, with the result that the waveform as shown in FIG. 4a may be obtained by scanning one character while the waveform of a different level as shown in FIG. 4b is obtained by scanning another character. The output produced by bi-valuing the signal with the waveform of FIG. 4a with respect to the fixed threshold values $L_1$ and $L_2$ is obviously different from that produced by bi-valuing the signal of FIG. 4b with respect to the same threshold value. In other words, even when a plurality of pattern signals corresponding to the same portion are bi-valued at a fixed threshold, different outputs are produced due to the difference in shade of characters, thereby making it impossible to effect a bi-valuing process for always converting character portions into 1 and the background into 0. Therefore, the variable threshold circuit 4 provides the means for changing the threshold values $L_1$ and $L_2$ of the bi-valuing circuits 2 and 3 in accordance with the pattern input signal.

The outputs from the bi-valuing circuits 2 and 3 are applied to a bi-valued signal processing circuit 5 for reconverting the bi-valued signals. Assume that the bi-valuing circuits 2 and 3 produce 1 signals in response to input signals higher than the threshold values $L_1$ and $L_2$ respectively and 0 signals in response to input signals lower than them. If the output of the bi-valuing circuit 2 is a bit higher than that of the bi-valuing circuit 3, the combined output of the bi-valuing circuits 2 and 3 is "1,1" above the level $L_1$ of the input pattern signal, "0,1" between $L_1$ and $L_2$, and "0,0" below $L_2$. To facilitate understanding, a signal higher than $L_1$ is hereinafter referred to as a high level signal $Sh$, a signal between $L_1$ and $L_2$ as a medium signal $Sm$ and a signal below $L_2$ as a low level signal $Sl$. The bi-valued signal processing circuit 5 is for converting high level signals into 1 and low level signals into 0 while at the same time converting medium signals into 1 or 0 by reference to peripheral information of the pattern portions corresponding to such medium signals. As an example, description will be made below of the operation of the bi-valued signal processing circuit 5 for processing the pattern as expressed in FIG. 5a.

Figure 5C:
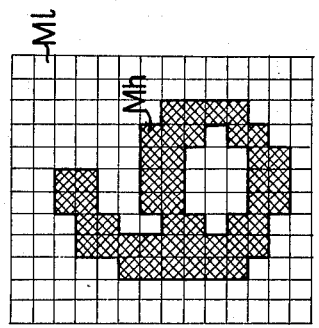
FIGS. 5a, 5b and 5c show diagrams for explaining the processes through which a bi-valued pattern is obtained according to the present invention.
Figure 5B:
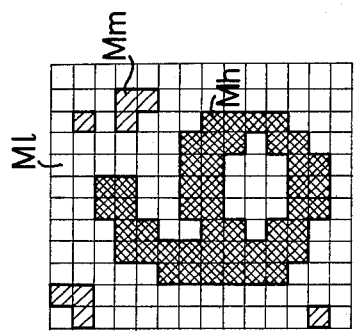
Figure 5A:
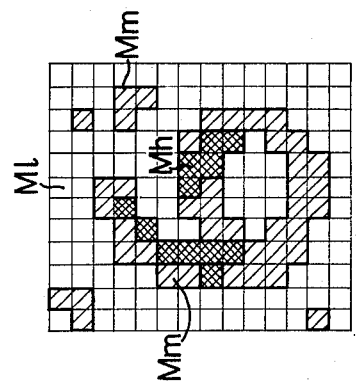

Symbol $Mh$ shows a deep black region the scanning of which produces the high level signal $Sh$, symbol $Mm$ a thinned region or smear or stain on the paper face which is hereinafter referred to as the gray region the scanning of which produces the medium level signal $Sm$, and symbol $Ml$ the white region of the original the scanning of which produces the low level signal $Sl$. Upon receipt of a medium level signal $Sm$, the bi-valued signal processing circuit 5 checks whether any deep black regions $Mh$ adjacent to the corresponding gray region exist or not and, if there are any black regions $Mh$, reconverts that gray region $Mm$ into a black region $Mh$. This process is repeated for all gray regions adjacent to black regions, so that the pattern of FIG. 5 is converted into the pattern of FIG. 5b. The gray regions which are spaced from the black regions $Mh$, that is, stains or smears remaining unchanged as shown in FIG. 5 are reconverted into white regions $Ml$, with the result that the pattern of FIG. 5b is improved into a high-quality bi-valued pattern as shown in FIG. 5c. In this way, thinned portions of characters are discriminated from stains or smears on the paper face and applied to the black and white regions respectively.

Each component unit of the system according to the present invention will be described in detail below.

FILTERING UNIT

Figure 6A:
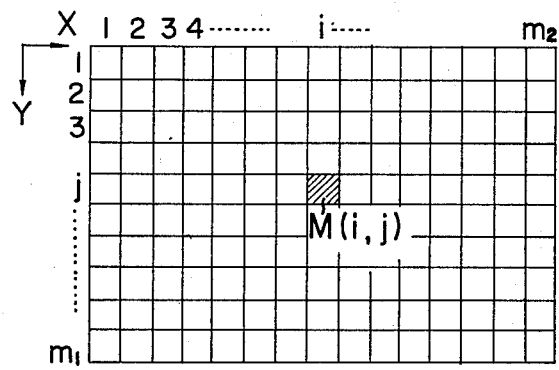
FIGS. 6a and 6b are diagrams for explaining the operation of the invention.
Figure 6B:
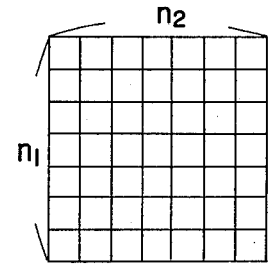
Figure 10D:
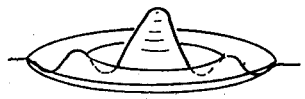

The filtering unit has the function to remove, as mentioned above, high frequency noise such as a small spot stain and low frequency noise such as the effect of gradients of the brightness of the background except the pattern signal. Assuming that the pattern screen is formed of $m_1 \times m_2$, small regions as shown in FIG. 6a and a mask is formed of $n_1 \times n_2$, small regions as shown in FIG. 6b, the filtering operation of the mask is expressed by the following equation:

$$R(i,j) = \sum_{k=\alpha_1}^{\beta_1} \sum_{l=\alpha_2}^{\beta_2} W(k,l) \cdot D(i+k, j+l) \qquad (1)$$

where
$1 \leq i \leq m_1,\ 1 \leq j \leq m_2$
$\alpha_1 = 1 - n_1/2,\ \beta_1 = n_1/2,\ n_1$: even number
$\alpha_1 = 1 - (n_1-1)/2,\ \beta_1 = (n_1-1)/2,\ n_1$: odd number
$\alpha_2 = 1 - n_2/2,\ \beta_2 = n_2/2,\ n_2$: even number
$\alpha_2 = 1 - (n_2-1)/2,\ \beta_2 = (n_2-1)/2,\ n_2$: odd number
$D(i,j)$ is a value before processing a given region $M(i,j)$, and $R(i,j)$ after processing the same. $W(k,l)$ is a weight function.

Figure 7:
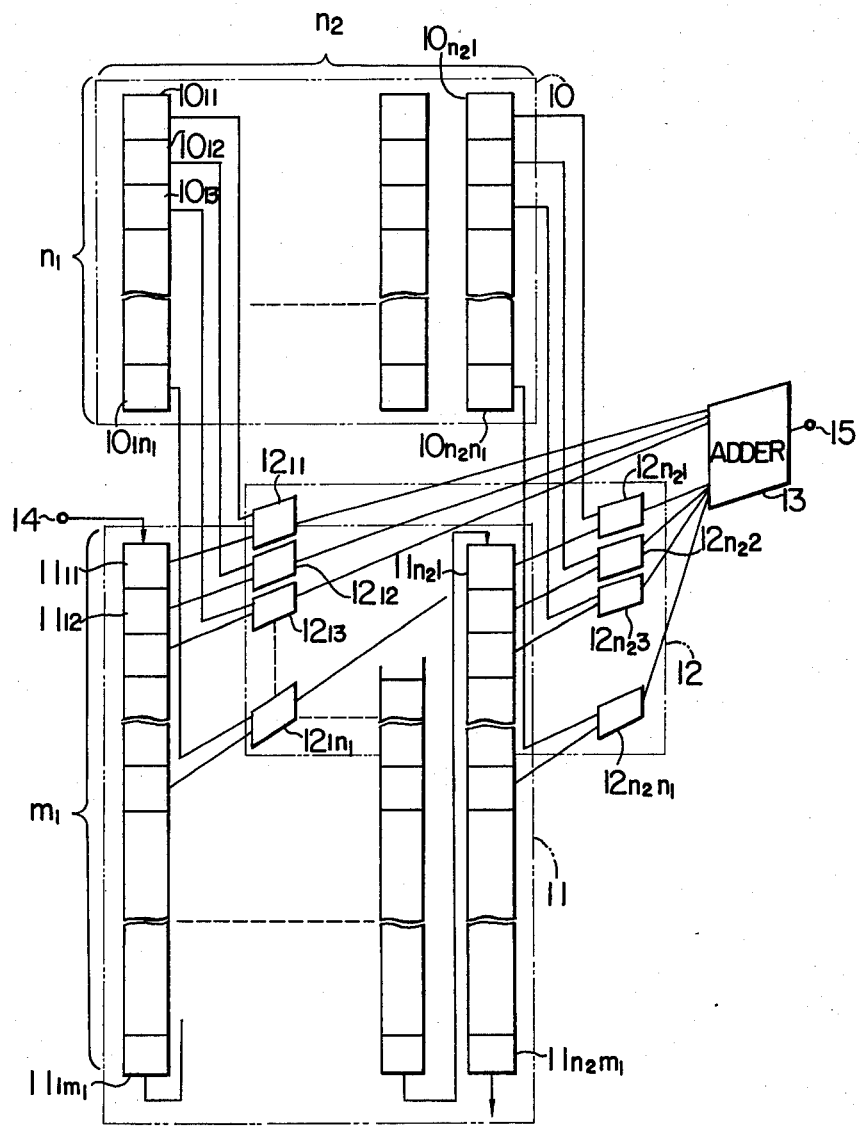
FIG. 7 is a block diagram showing an example of the filtering processing section of the system according to the invention.

An actual configuration of the filtering unit will be explained now with reference to FIG. 7. Reference numeral 10 shows a register group including registers $10_{11}$ to $10_{n_2 n_1}$ corresponding to and in the same number as the small regions $n_1 \times n_2$. Each of the registers has a depth or capacity of P bits, P being sufficiently large to indicate the weight of the mask. Reference numeral 11 shows a shift register group including shift registers $11_{11}$ to $11_{n_2 m_1}$. A pattern signal obtained by scanning sequentially the screen of FIG. 6a in the direction Y from 1 to $m_1$ is applied to the input terminal 14 of the shift register group 11. The content of each shift register shifts downwards in the drawing in sequence, so that the content of the lowest shift register, say, $11_{1m_1}$ shifts to the shift register $11_{21}$ at the top of the immediately right column. It is assumed here that each shift register has the depth of $q$ bits which is sufficient to express the full shades of the pattern. Reference numeral 12 shows a multiplier group including $n_1 \times n_2$ multipliers for obtaining the product of the content of the shift register $10_{ij}$ and the content of the shift register $11_{ij}$. The outputs of all the multipliers $12_{11}$ to $12_{n_2 n_1}$ are applied to the adder 13 for producing a sum thereof. Upon application of all data representing one picture element, that is, one region of FIG. 6a to the input terminal 14, the adder 13 produces at its output terminal 15 an output representing a corresponding one picture element which satisfies the equation (1).

In order to eliminate the shade variations in the background as shown in FIG. 3b and FIG. 3c by means of a filtering process, the depth of the register group 10 making up the mask, that is, the weight of the mask should be selected in the manner mentioned below.

For the sake of explanatory convenience, shade variations are assumed to be continuous. If the variations are made to approximate a plane of a predetermined gradient, the shade variations are generally expressed in the equation (2) below.

$$Z(x,y) = a \cdot x + b \cdot y + c \qquad (2)$$

where $Z(x,y)$ represents the value of shade at point $(x,y)$ on the screen and $a$, $b$ and $c$ proportional constants. The data indicated by $Z(x,y)$ is processed according to equation (1) in the manner as follows:

$$R(x,y) = \int_{-l_1}^{l_1} \int_{-l_2}^{l_2} W(u,v) \cdot Z(x+u, y+v) du dv \qquad (3)$$

$$= a \cdot \int_{-l_1}^{l_1} \int_{-l_2}^{l_2} u \cdot W(u,v) du dv + b \cdot \int_{-l_1}^{l_1} \int_{-l_2}^{l_2} v \cdot W(u,v) du dv$$

$$+ (a \cdot x + b \cdot y + c) \int_{-l_1}^{l_1} \int_{-l_2}^{l_2} W(u,v) du dv \qquad (4)$$

where $2l_1$ and $2l_2$ are sizes of the mask.

If equation (4) is zero in identity, planar variations in shade are eliminated. The condition for that is expressed by the equations (5), (6) and (7) below.

$$a \cdot \int_{-l_1}^{l_1} \int_{-l_2}^{l_2} u \cdot W(u,v) du dv = 0 \qquad (5)$$

$$b \cdot \int_{-l_1}^{l_1} \int_{-l_2}^{l_2} v \cdot W(u,v) du dv = 0 \qquad (6)$$

$$(a \cdot x + b \cdot y + c) \int_{-l_1}^{l_1} \int_{-l_2}^{l_2} W(u,v) du dv = 0 \qquad (7)$$

If the equations (5) and (6) are to be satisfied, $W(u,v)$ must be an even function with respect to each of $u$ and $v$. This means that the mask is required to be symmetric with respect to both $X$ and $Y$ axes. From equation (7), $$\int_{-l_1}^{l_1} \int_{-l_2}^{l_2} W(u,v) du dv = 0 \qquad (8)$$

The equation (8) shows that the total weight of all the points of the mask is zero. As far as the digital pattern shown by equation (1) is concerned, the following equation is obtained:

$$\sum_{k=\alpha_1}^{\beta_1} \sum_{l=\alpha_2}^{\beta_2} W(k,l) = 0 \qquad (9)$$

FIG. 8a is a graph indicating the weight distribution satisfying the equation (8) and FIG. 8b the weight coefficients of the mask regions satisfying the equation (9). Assume that a pattern having a shade distribution as shown in FIG. 9a is filtered by the use of a mask having the weight as shown in FIG. 8a or FIG. 8b. A pattern with a shade distribution as shown in FIG. 9b is obtained. As will be seen from this diagram, the filtering process eliminates the general gradient of the shade in the background, while at the same time relieving the character pattern by "digging" the portion around the character pattern, thus making it possible to produce a high quality bi-valued pattern through the bi-valuing process in a subsequent stage. Further, this feature is effective in emphasizing a specific line width of a character.

Different weight distributions of the mask according to the invention are shown in FIGS. 10a, 10b, 10c and 10d, a mask with a proper weight distribution being selected depending on the range desired to be emphasized and object of filtering.

BI-VALUED SIGNAL PROCESSING

Information associated with each mesh or small region $M_{ij}$ in the screen of FIG. 6a is converted into an electrical signal by a pattern input device such as a vidicon and stored in an appropriate memory not shown. Signals $S_{i-1,j-1}$, $S_{i,j-1}$, $S_{i+1,j-1}$, $S_{i+1,j}$, $S_{i+1,j}$, $S_{i-1,j+1}$, $S_{i,j+1}$, and $S_{i+1,j+1}$ corresponding to a given mesh $M_{ij}$ and surrounding small regions on the screen (hereinafter referred collectively as $NS_{i,j}$) are applied through the threshold circuit 51 to 52 having the threshold value $L_1$ to an OR circuit 53. If the output of the OR gate 53 is in the state of 1, it indicates that at least one of the surrounding signals $NS_{i,j}$ is Sh, that is to say, the mesh $M_{i,j}$ is adjacent to the black region Mh (See FIG. 5a to FIG. 5b). The signal $S_{i,j}$ is applied through the threshold circuit 2 having the threshold value $L_1$ and through the threshold circuit 3 having the threshold value $L_2$ to the OR gate 55 and the AND gate 54, respectively, the output of the AND gate 54 being applied to the OR gate 55. As a result, the output signal $S'_{i,j}$ of the OR gate 55 becomes 1 either when the signal $S_{i,j}$ is Sh above the threshold value $L_1$ or when the signal $S_{i,j}$ is Sm above the threshold value $L_2$ on one hand and the output of the OR gate 53 is 1, that is, at least one of the peripheral signals is Sh. In other words, the output signal $S'_{i,j}$ in 1 state is produced when the small region $M_{ij}$ is black or when it is gray and adjacent a black region.

Employing the signal $S'_{i,j}$ as an output signal subjected to the pre-processing does not necessarily lead to satisfactory results. In other words, in the case where the signal $S_{i,j}$ is Sm at medium level and at least one of the adjacent signals $NS_{i,j}$ is a high level signal Sh, the mere conversion of the medium level signal Sm into the high level signal Sh may not suffice. For example, it is actually more effective to convert the signal $S_{i,j}$ into the high level signal Sh; in the event that the signal $S_{i,j}$ is in the medium level, signal $S_{i-1,j}$ is in medium level and signal $S_{i-2,j}$ is in high level.

Figure 12:
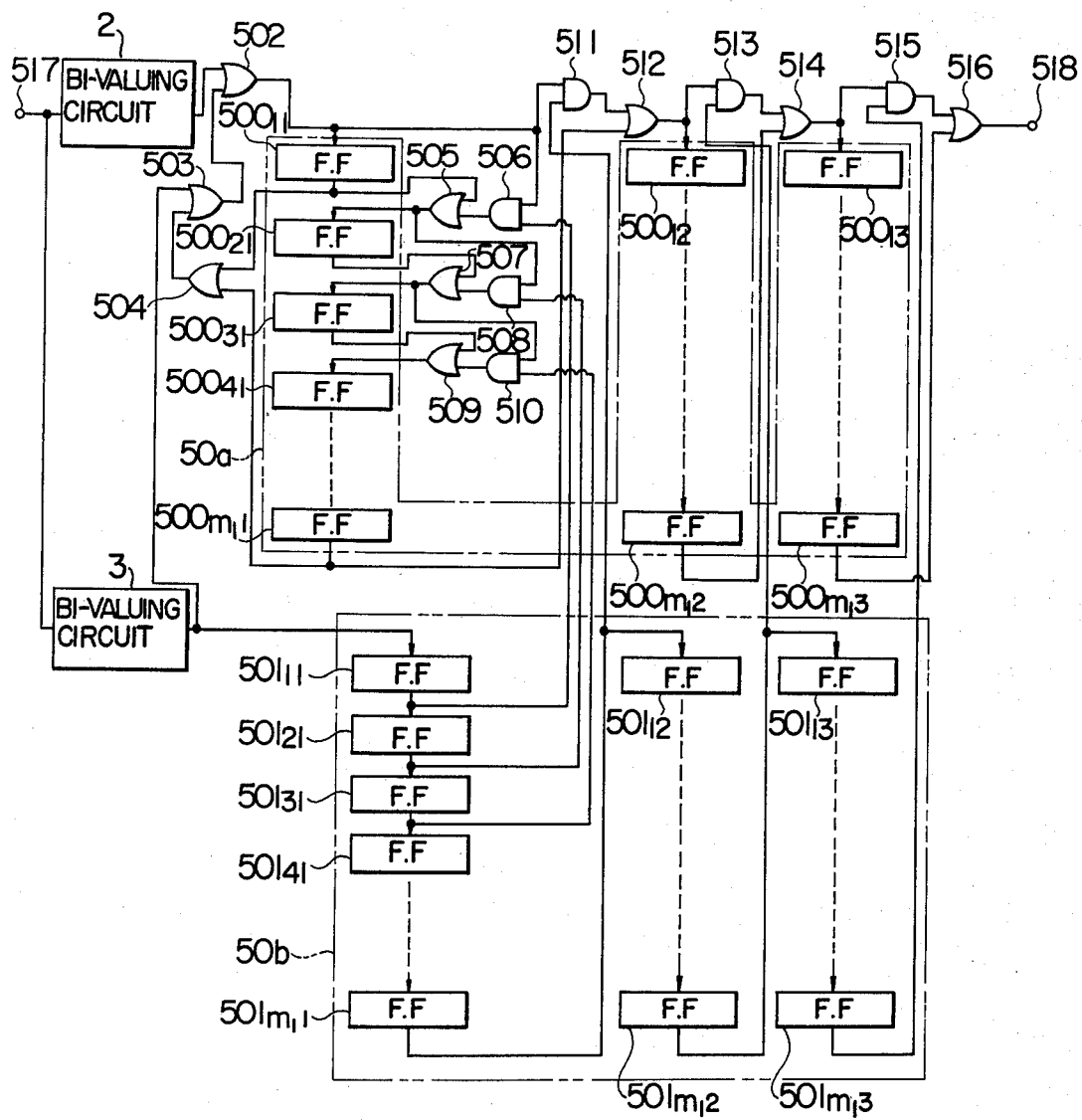

A typical construction of the bi-valued signal processing device meeting the above-mentioned requirement is shown in FIG. 12. The signals $S_{11}$, $S_{12}$, .... $S_{21}$, $S_{22}$, $S_{23}$ .... corresponding to the regions shown in FIG. 6a are applied in that order to the input terminal 517. The signal S is divided into two values at the threshold $L_1$ by the threshold circuit 2, so that the high level signal Sh is converted into 1 and the medium level signal Sm and the low level signal Sl into 0. Also, the signal S is bi-valued at the threshold level $L_2$ by the threshold circuit 3 in such a manner that the low level signal $Sl$ is converted into 0 while the high level signal $Sh$ and medium level signal $Sm$ into 1.

The output of the bi-valuing circuit 2 is applied through the OR gate 502 to the shift register group 50a, while the output of the bi-valuing circuit 3 is applied to the shift register group 50b. Each of the shift register groups 50a and 50b comprises three columns each including $m_1$ flip-flops. The input to the flip-flop $500_{11}$ in the first stage of the shift register group 50a and the output of the flip-flop $501_{11}$ in the first stage of the shift register group 50b are applied to the AND gate 506, while the output of the AND gate 506 and that of the flip-flop $500_{11}$ are applied to the OR gate 505. The output of the OR gate 505 is applied to the flip-flop $500_{21}$ in the second stage of the first column of the shift register group 50a. The flip-flop in the $d$'th stage subsequent to the second stage is connected in similar way. ($d$ is 4 in the embodiment under consideration). The flip-flops subsequent to the $d$'th stage are such that a flip-flop is impressed with an output of the flip-flop in the preceding stage and applies an output to the flip-flop in the next stage.

When the input to the flip-flop $500_{11}$ is in the state of 1 and the output of the flip-flop $501_{11}$ is in the 1 state, the input to the flip-flop $500_{21}$ is 1 regardless of the output of the flip-flop $500_{11}$. This shows that when a signal $S_{i,j}$ of a given region is at high level and region signal $S_{i+1,j}$ is at medium level, the medium level signal is converted into a high level signal and applied to the flip-flop $500_{21}$.

The input to the flip-flop $500_{11}$ in the first stage of the first column of the shift register 50a and the output from the flip-flop $501_{mil}$ in the last stage of the first column of the shift register 50b are applied to the AND gate 511, while the output of the AND gate 511 and the output of the flip-flop $500_{mil}$ are applied to the OR gate 512. The output of the OR gate 512 is applied to the first stage flip-flop $500_{12}$ of the shift register in the second column. The flip-flops in the subsequent columns are also connected in similar way.

In this arrangement, when the signal $S_{i,j}$ is at high level, it is decided whether or not column signals $S_{i+1,j}$, $S_{i+2,j}$ and $S_{i+3,j}$ and row signals $S_{i,j+1}$, $S_{i,j+2}$ and $S_{i,j+3}$ are to be converted into high level signals at the same time. In other words, when the signal $S_{i+1,j}$ is at medium level, it is converted into a high level signal. On the other hand, when the $S_{i+2,j}$ is at medium level and at the same time it is decided that the signal $S_{i+1,j}$ is to be converted into a high level signal $Sh$, the medium level signal $Sm$ is converted into a high level signal $Sh$. Further, when the signal $S_{i+3,j}$ is at medium level and at the same time it is decided that the signal $S_{i+2,j}$ is to be converted into a high level signal $Sh$, the medium level signal $Sm$ is converted into a high level signal $Sh$. This is also the case with the row signals $S_{i,j+1}$, $S_{i,j+2}$ and $S_{i,j+3}$.

The outputs from the flop-flop $500_{11}$ in the first stage and from the flip-flop $500_{mil}$ in the last stage of the first column of the shift register 50a are applied to the OR gate 504, the output of which is applied together with the output of the bi-valuing circuit 3 to the AND gate 503. Also, the output of the AND gate 503 is applied to the OR gate 502.

When the output of the flip-flop $500_{11}$ or of the flip-flop $500_{mil}$ is in 1 state and at the same time the input to the flip-flop $501_{11}$ is in the state of 1, the input to the flip-flop $500_{11}$ becomes 1 regardless of the output of the threshold circuit 2. This means that when a given region signal $S_{i+1,j}$ or signal $S_{i,j+1}$ is at high level and at the same time the region signal $S_{i,j}$ is at medium level, the medium level signal $Sm$ is converted into a high level signal $Sh$.

In the aforementioned embodiment, even though the scope of conversion is limited, there is no need for repetitive processing, thus making possible continuous processing in the row scan mode of the vidicon. Further, in spite of the fact that the regions converted included only three both in row and column directions in the embodiment under consideration, the number of regions to be converted may be easily increased. Furthermore, although the embodiment in question is such that a signal representing a given region is adapted to be converted in accordance with the signals of vertically or horizontally adjacent regions, a different arrangement is possible in which such a given signal may be converted in accordance with a signal representing an obliquely adjacent region. In addition, there may be provided three instead of two threshold circuits to produce a pattern signal at an intermediate level.

VARIABLE THRESHOLD CIRCUIT 4

Shade distributions of a couple of lines of different shades are shown in FIG. 13a and FIG. 13b respectively. The results of tri-valuing the patterns at two threshold values $L_1$ and $L_2$ are shown in FIG. 14a and FIG. 14b respectively, FIGS. 15a and 15b illustrating top plan views of FIGS. 14a and 14b respectively.

In FIG. 15a and FIG. 15b, assume that the width of the signals above threshold level $L_2$ is $k_{11}$ and $k_{21}$ respectively, the width thereof above threshold level $L_1$ is $k_{12}$ and $k_{22}$, the length of the line of FIG. 15a is $l_1$, that of the line of FIG. 15b is $l_2$, the areas of the portions above the threshold level $L_2$ are $S_{11}$ and $S_{21}$ and the areas of the portions below the threshold level $L_1$ are $S_{12}$ and $S_{22}$, respectively; then $$S_{11} = k_{11} \times l_1, S_{12} = k_{12} \times l_1$$

$$S_{21} = k_{21} \times l_2, S_{22} = k_{22} \times l_2$$

where $S_{11}$, $S_{12}$, $S_{21}$ and $S_{22}$ take different values depending on the length of the lines, that is, on the pattern. On the contrary, the ratio between $S_{11}$ and $S_{12}$ and that between $S_{21}$ and $S_{22}$ are $$K_1 = S_{11}/S_{12} = (k_{11} \times l_1)/(k_{12} \times l_1) = k_{11}/k_{12}$$

$$K_2 = S_{21}/S_{22} = (k_{21} \times l_1)/(k_{22} \times l_2) = k_{21}/k_{22}$$

which are independent of the length of the lines, that is, of the types of a pattern and can be used as an index for indicating the pattern quality. In the present case, $K_1$ is smaller than $K_2$. Referring to the shade distribution of FIG. 13b, $S_{22}$ can be enlarged by reducing the threshold level $L_1$, with the result that the value $K_2$ is decreased, thereby making it possible to render the quality of the pattern of FIGs. 13b and 14b conform with that of FIGS. 13a and 14a. Since the value $K_2$ can be reduced also by increasing the threshold $L_2$, however, it is still difficult to decide which of the thresholds should be changed. In spite of this, this method of determining the pattern quality is effective in cases where the decision as to threshold selection is supported by examination of other conditions.

This decision is facilitated in dividing a pattern signal into four values by the use of three threshold levels $L_1$, $L_2$ and $L_3$ ($L_1 > L_2 > L_3$). Assume that as in the case of FIG. 14a and FIG. 14b the areas of portions under threshold level $L_3$ are $A_0$ and $B_0$, the areas between $L_2$ and $L_3$ are, $A_1$ and $B_1$, the areas between $L_1$ and $L_2$ are $A_2$ and $B_2$ and the areas above $L_1$ are $A_3$ and $B_3$, respectively. As explained earlier, $K_{A1} = A_1/A_3$, $K_{A2} = A_2/A_3$, $K_{B1} = B_1/B_3$ and $K_{B2} = B_2/B_3$ are all values affected in the least by the types of patterns. If a reference value for $K_{A1}$ and $K_{B1}$ is $S_1$ and a reference for $K_{A2}$ and $K_{B2}$, $S_2$, then the values $K_{A1}$ and $K_{A2}$ can be made to approximate the reference values respectively:

1. by reducing $L_1$ when $K_{A1} > S_1$ and $K_{A2} > S_2$
2. by increasing $L_3$ when $K_{A1} > S_1$ and $K_{A2} = S_2$
3. by reducing $L_2$ when $K_{A1} > S_1$ and $K_{A2} < S_2$
4. by increasing $L_2$ and $L_3$ when $K_{A1} = S_1$ and $K_{A2} > S_2$
5. by reducing $L_2$ and $L_3$ when $K_{A1} = S_1$ and $K_{A2} < S_2$
6. by increasing $L_2$ when $K_{A1} < S_1$ and $K_{A2} > S_2$
7. by reducing $L_3$ when $K_{A1} < S_1$ and $K_{A2} = S_2$
8. by increasing $L_1$ when $K_{A1} < S_1$ and $K_{A2} < S_2$ In this case, if $S_1$ and $S_2$ are provided with a certain margin width, the same effect as mentioned above may be achieved only by adjusting the level of threshold $L_2$ when $K_{A1} = S_1$.

Description will be made now of an actual construction of the variable threshold circuit 4.

Figure 16:
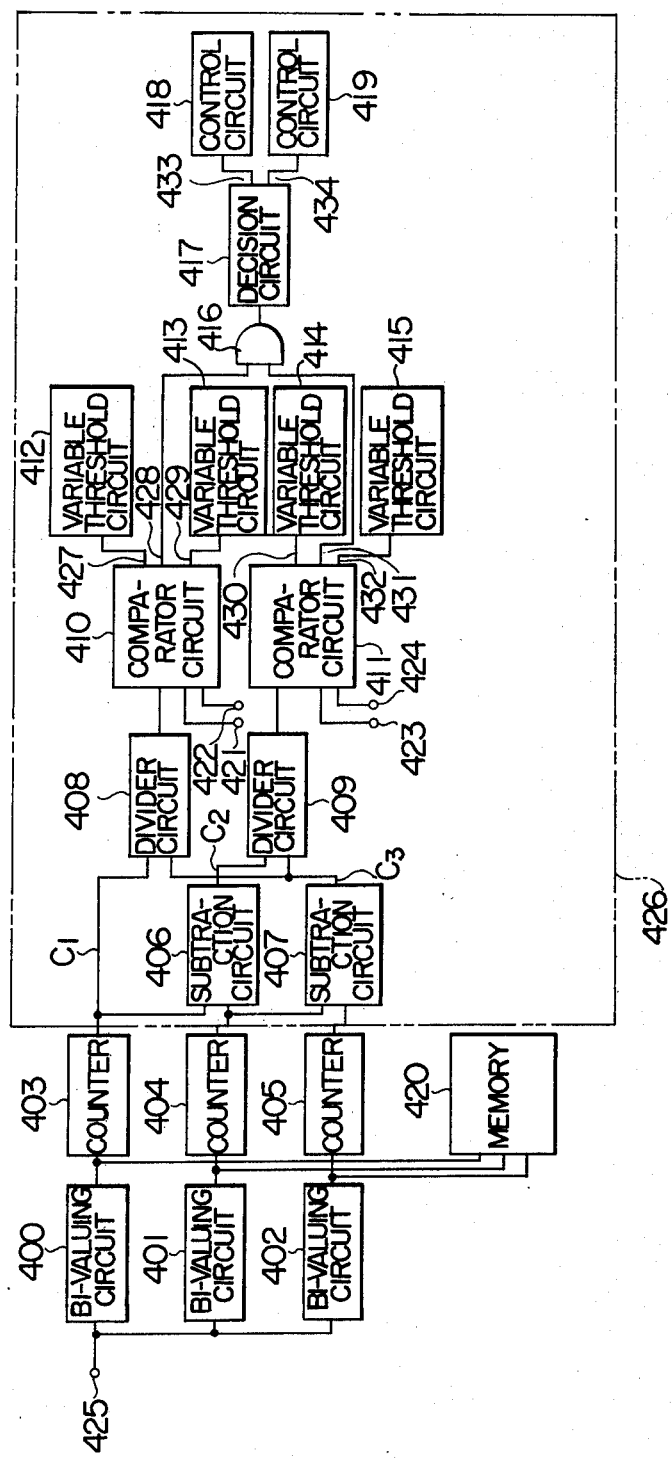
FIGS. 16 and 17 are block diagrams showing examples of the variable threshold circuit section according to the invention.

Referring to FIG. 16, a signal representing the shade of an input pattern is applied through the input terminal 425 to the threshold circuits 400, 401 and 402 having the threshold levels $L_1$, $L_2$ and $L_3$, respectively. The threshold circuits 400, 401 and 402 produce a 1 output in response to an input higher than the threshold levels $L_1$, $L_2$ and $L_3$ respectively, and a 0 signal in response to an input signal below the respective threshold values, it being assumed that $L_1 > L_2 > L_3$. Reference numerals 403, 404 and 405 show counters for adding 1 in response to a 1 signal, which count the number of 1 signals for each pattern. The section 426 of the circuit of FIG. 16 is so controlled as to be energized on completion of collection of one pattern. Numeral 406 shows a subtraction circuit for producing a difference between the outputs of the counters 403 and 404, while the subtraction circuit 407 produces an output representing the difference between the outputs of the counters 404 and 405. As a result, the output of the subtractor 406 provides the number $C_2$ of picture elements between $L_1$ and $L_2$, while the output of the subtractor 407 gives the number $C_3$ of picture elements between $L_2$ and $L_3$, the output of the counter 403 providing the number $C_1$ of picture elements above $L_1$. Reference numerals 408 and 409 show dividing circuits for producing the ratio between $C_1$ and $C_3$ and that between $C_2$ and $C_3$, respectively. Numerals 410 and 411 show comparator circuits. Numerals 421, 422, 423 and 424 show input terminals to which reference signals $S_1$, $S_2$, $S_3$ and $S_4$ of given values are applied ($S_1 > S_2$, $S_3 > S_4$). The comparator circuit 410 produces a 1 signal on its output line 427 and 0 signal at the output lines 428 and 429 when the output from the divider circuit 408 is above $S_1$. When the output of the divider circuit 408 is between $S_1$ and $S_2$, a 1 signal is produced on the output line 428, while a 1 signal is produced on the output line 429 when the output of the divider circuit 408 is below $S_2$. On the other hand, the comparator circuit 411 produces a 1 signal on the output line 430 when the output of the divider circuit 409 is above $S_3$, and a 1 signal on the output line 431 when between $S_3$ and $S_4$, and a 1 signal on the output line 432 when below $S_4$. Reference numerals 412, 413, 414 and 415 show circuits for changing the threshold levels which are energized only in response to a 1 signal applied thereto. The circuit 412 changes the threshold from $L_1$ to $L_1 + \alpha_1$ in response to a 1 signal, the circuit 413 from $L_1$ to $L_1 - \alpha_2$ in response to a 1 signal, the circuit 414 from $L_2$ to $L_2 + \beta_1$ in response to a 1 signal, and the circuit 415 from $L_2$ to $L_2 - \beta_2$ in response to a 1 signal, where $\alpha_1$, $\alpha_2$, $\beta_1$ and $\beta_2$ are given constants or variables. These variable threshold circuits 412, 413, 414 and 415 may also be used to change the threshold level $L_3$.

Reference numeral 416 shows an AND gate which produces a 1 signal when the signals on the output lines 428 and 431 are both in the state of 1. The decision circuit 417 produces a 1 signal on the output line 433 in response to a 1 signal applied to the input thereof, and produces a 1 signal to the output line 434 in response to a 0 signal. The control circuit 418 is energized when the signals on the output lines 428 and 431 are both 1, that is, when a pattern of desired quality is obtained; with the result that the threshold values $L_1$, $L_2$ and $L_3$ of the threshold circuits 400, 401 and 402 are restored to their respective reference values, while at the same time resetting the counters 403 to 405 thereby to perform a controlling operation in preparation for the next process. Reference numeral 419 shows another control circuit which, in the absence of a pattern of desired quality, is energized thereby to reset the counters 403 to 405, so that the same pattern is processed again by the use of different threshold values obtained by the operation of the variable threshold circuits 412, 413, 414 and 415. Numeral 420 shows a circuit for subjecting to the next process the pattern divided into four values by the three threshold levels, or not more than a memory storing the resulting pattern only.

Figure 17:
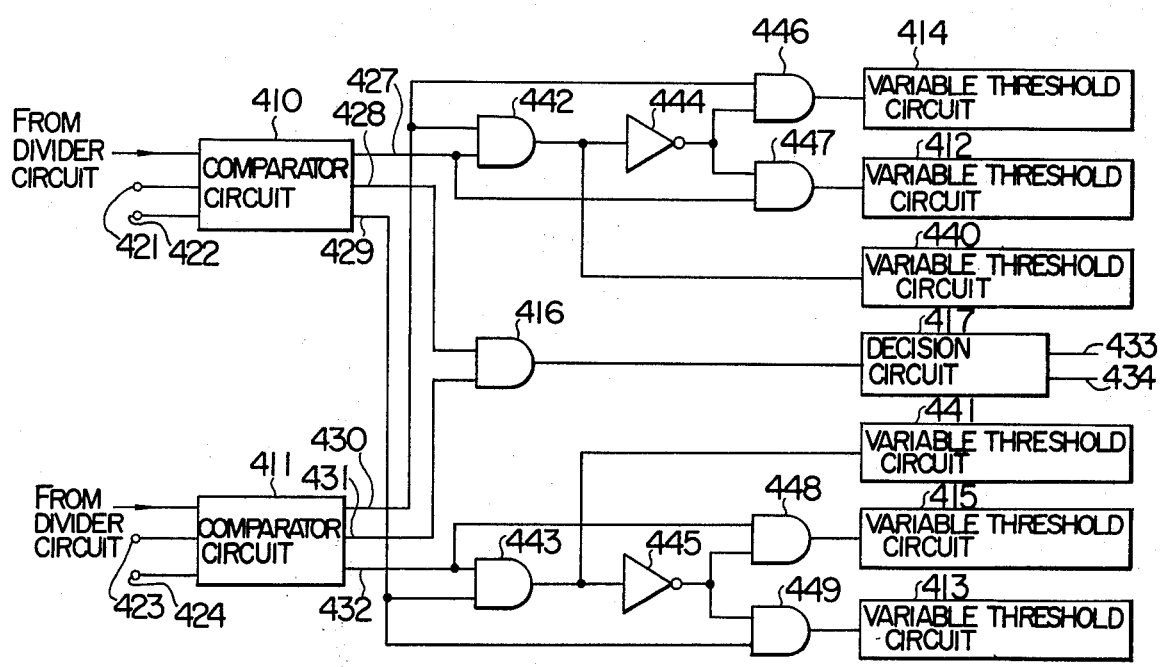

Another example of the construction of the essential parts of the variable threshold circuit is shown in FIG. 17, in which like component elements are denoted by like reference numerals as in FIG. 16.

The AND gate 442 produces a 1 signal when the signals on the output lines 427 and 430 are both in the state of 1, that is, the outputs of the divider circuits 408 and 409 are both above the reference values. The threshold circuit 440 changes the threshold from $L_3$ to $L_3 - \gamma_2$ in response to a 1 signal applied to the input thereof. The change in threshold causes the output $C_3$ of the subtraction circuit 407 to be increased and therefore causes the output of the divider circuits 408 and 409 to be reduced, with the result that a pattern nearer to a desired pattern in quality is obtained. The output of the AND gate 442 is reversed by the inverter 444 and applied to the AND gates 446 and 447. A signal in the state of 1 is applied from the AND gates 446 and 447 to the variable threshold circuits 414 and 412 when only one of the signals on the output lines 427 and 430 is in the state of 1. A similar circuit is made up of the AND gates 443, 448 and 449 and inverter 445, so that a 1 signal is applied to the variable threshold circuit 441 when the outputs of the divider circuits 408 and 409 are both below the reference value. The circuit 441 changes the threshold from $L_3$ to $L_3 + \gamma_1$ when a 1 signal is applied thereto. In the foregoing description, $\gamma_1$ and $\gamma_2$ are given constants or variables like $\alpha_1$, $\alpha_2$, $\beta_1$ and $\beta_2$.

In the bi-valuing circuit 400, counter 403, subtraction circuit 406, divider circuit 408, comparator circuit 410, variable threshold circuits 412 and 413 and AND gate 416 are removed from the circuit arrangement of FIG. 16 and the output of the counter 404 and the output line 431 are connected to the divider circuit 409 and to the decision circuit 417 respectively, a circuit is obtained from determining two threshold levels. It will also be understood from FIG. 16 the manner in which a circuit can be formed for determining four or more threshold values.

Further, the circuit configuration can be simplified by removing the subtraction circuits 406 and 407, and by connecting the output of the counter 405 to the input of the divider circuits 408 and 409 and also by connecting the output of the counter 404 to the input of the divider circuit 409. In this case, the output of the divider circuit 408 makes up the ratio between $C_1$ and $(C_1 + C_2 + C_3)$, and the output of the divider circuit 409 that between $(C_1 + C_3)$ and $(C_1 + C_2 + C_3)$.

It will be thus seen that the objects set forth above, among those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

We claim:

1. A pattern preliminary processing system comprising filtering means for filtering pattern signals by means of a mask, the weight of the respective regions on the mask being nearly symmetrical with respect to the center of the mask and the total weight of all regions of the mask being nearly zero so as to emphasize the variations in shade along the boundary between the pattern and background, first bi-valuing means for dividing the output of said filtering means into two values at a first threshold level, second bi-valuing means for dividing the output of said filtering means into two values at a second threshold level lower than said first threshold level, and means for classifying pattern signals between said first and second threshold levels into a first state and a second state by reference to the signal level of small regions adjacent to the regions corresponding to said pattern signals, said first state including signals above said first threshold level, said second state including signals under said second threshold level.

2. A pattern preliminary processing system according to claim 1, in which said classifying means comprises a plurality of third bi-valuing elements for dividing signals representing a plurality of small regions, adjacent to a small region which corresponds to an input signal, into two values at said first threshold level, an OR gate to which each output of said third bi-valuing elements is applied, an AND gate to which the output of said second bi-valuing means and the output of said OR gate are applied, and an OR gate to which the output of said first bi-valuing means and the output of said AND gate are applied.

3. A pattern preliminary processing system according to claim 1, in which said classifying means comprises: a first register group including a plurality of flip-flops connected in N columns, where N is a positive integer, in such a manner that the output of said first bi-valuing means pass sequentially through said plurality of said flip-flops; a second register group including a plurality of flip-flops connected in N columns, where N is a positive integer, in such a manner that the output of said second bi-valuing means pass sequentially through said plurality of said flip-flops; a gate circuit including an OR gate to which the outputs of the flip-flops in the first and last stages of the first column of said first register group are applied, and an AND gate to which the output of said OR gate and the output of said second bi-valuing means are applied, the output of said AND gate being applied to said first register group; a second gate circuit including an AND gate to which the output of the flip-flop at the Mth stage, where M is a positive integer, of each column of said second register group and the input of the flip-flop of the Mth stage, where M is a positive integer, of each column of said first register group are applied, and an OR gate to which the output of said AND gate and the output of the flip-flop at Mth stage of each column of said first register group are applied, the output of said OR gate being applied to the flip-flop at (M + 1)th stage in each column of said first register group; and a third gate circuit including an AND gate to which the input to the flip-flop at the first stage in each column of said first register group and the output of the flip-flop at the last stage of each column of said second register group are applied, and an OR gate to which the output of said AND gate and the output of the flip-flop at the last stage in each column of said first register group are applied, the output of said OR gate being applied to the flip-flop at the first stage in the next column of said first register group.

4. A pattern preliminary processing system according to claim 1, further comprising a variable threshold circuit which is capable of varying the threshold levels associated with said first and second bi-valuing means in accordance with a pattern input signal.

5. A pattern preliminary processing system according to claim 4, in which said variable threshold circuit includes a plurality of bi-valuing circuits for dividing each pattern input signal into two values at different threshold levels, a plurality of counters for counting the outputs of said bi-valuing circuits, a divider circuit for producing the ratio between the counting results classified into different levels with respect to said threshold levels, and a control circuit for comparing the output of said divider circuit with a reference and changing said first and second threshold levels in accordance with the result of the comparison.

6. A pattern preliminary processing system comprising:

filtering means including a first register group for storing pattern input signals, a second register group for storing information of the weight of a mask, a circuit for multiplying the contents of said first register group by the corresponding contents of said second register group, and a circuit for adding the outputs of said multiplying circuit, so as to emphasize the variations in shade along the boundary between the pattern and background;

first bi-valuing means for dividing the output of said filtering means into two values at a first threshold level;

second bi-valuing means for dividing the output of said filtering means into two values at a second threshold level lower than said first threshold level; and means for classifying pattern signals between said first and second threshold levels into a first state and a second state by reference to the signal level of small regions adjacent to the regions corresponding to said pattern signals, said first state including signals above said first threshold level, said second state including signals under said second threshold level.

7. A pattern preliminary processing system according to claim 6, in which said second register group contains vertically and horizontally symmetric weight information, the total of the weight being zero.

8. A pattern preliminary processing system according to claim 6, in which said second register group contains weight information having a distribution with a positive center and a negative surrounding.

* * * * *